(12) United States Patent
Hsieh

(10) Patent No.: US 6,796,588 B2
(45) Date of Patent: Sep. 28, 2004

(54) SUCTION DEVICE WITH TELESCOPIC EVACUATING PIPES

(76) Inventor: Tsung-Chang Hsieh, No. 57, Yung An Street, Lung-Tan Hsiang, Taoyuan Hsien (TW)

( * ) Notice: Subject to any disclaimer, the term of this patent is extended or adjusted under 35 U.S.C. 154(b) by 255 days.

(21) Appl. No.: 10/227,850

(22) Filed: Aug. 27, 2002

(65) Prior Publication Data

US 2004/0041321 A1 Mar. 4, 2004

(51) Int. Cl.$^7$ .............................. B66C 1/02; B25J 15/06
(52) U.S. Cl. ....................................... 294/65; 294/81.21
(58) Field of Search .................. 294/64.1, 65, 81.1, 294/81.2, 81.21, 81.5, 81.6; 414/627, 737, 752.1; 901/40

(56) References Cited

U.S. PATENT DOCUMENTS 4,685,714 A * 8/1987 Hoke ......................... 294/81.2
5,135,276 A * 8/1992 Blatt et al. .................... 294/65
5,152,566 A * 10/1992 Blatt et al. .................. 294/81.2
6,722,842 B1 * 4/2004 Sawdon et al. ............. 414/729

* cited by examiner

Primary Examiner—Dean J. Kramer
(74) Attorney, Agent, or Firm—Rosenberg, Klein & Lee

(57) ABSTRACT

The present invention relates to a suction device with telescopic evacuating pipes which includes a cantilever, a plurality of glide pieces, a pipe-collecting piece and a plurality of telescopic evacuating pipes. The cantilever is provided with a glide groove at both sides thereof. The glide pieces are movable along the glide groove of the cantilever and are positioned by fastening knobs. Each of the glide pieces has a vacuum sucker 132 at the bottom thereof. A first connector is arranged at one side of the glide pieces and used to connect through the internal piping with the vacuum sucker. The pipe-collecting piece is installed at the inner end of the cantilever and is used to join second connectors in connection with a vacuum generator through hosepipes. One end of the telescopic evacuating pipe is fastened at the outer end of the pipe-collecting piece while the other end is connected to the first connector. Accordingly, the evacuating pipes can adjust its length in accordance with different arrangement positions of vacuum suckers.

6 Claims, 9 Drawing Sheets

SUCTION DEVICE WITH TELESCOPIC EVACUATING PIPES

BACKGROUND OF THE INVENTION

1. Field of the Invention

The present invention relates to a suction device with telescopic evacuating pipes, and more particularly, to a suction device which achieves neat and space-saving piping through telescopic design.

2. Description of the Prior Art

In the industry, it's often to install a plurality of suction devices with vacuum sucker to suck and move workpieces. For example, the suction plate of take-up and put-down equipment for circuit board is shown in FIG. 1. The conventional communicating way between vacuum suckers and vacuum generator utilizes hosepipes 21 to connect the vacuum suckers 20 and the vacuum generator (not shown). However, the suction device has to distribute the vacuum suckers 20 well so as to increase the suction area. As a result, the connecting hosepipes are in a mess because of its large amount and no fixed direction. Moreover, the hose pipe has to be long enough for adjusting to the different positioning of the vacuum suckers 20. However, the long hosepipe will be upwardly curved, thereby affecting its appearance and occupying more space. Thus, the conventional suction device is not suitable to be operated in small operation room.

SUMMARY OF THE INVENTION

It is a primary object of the present invention to provide a suction device with telescopic evacuating pipes whose length is directly adjustable in accordance with different installation positions of the vacuum sucker, thereby having a consistent piping direction to achieve a neat arrangement effect.

It is another object of the present invention to provide a suction device with telescopic evacuating pipes which are neatly arranged in parallel so that the whole body of the suction device is flatly constructed. Accordingly, the present invention can be operated in small room.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
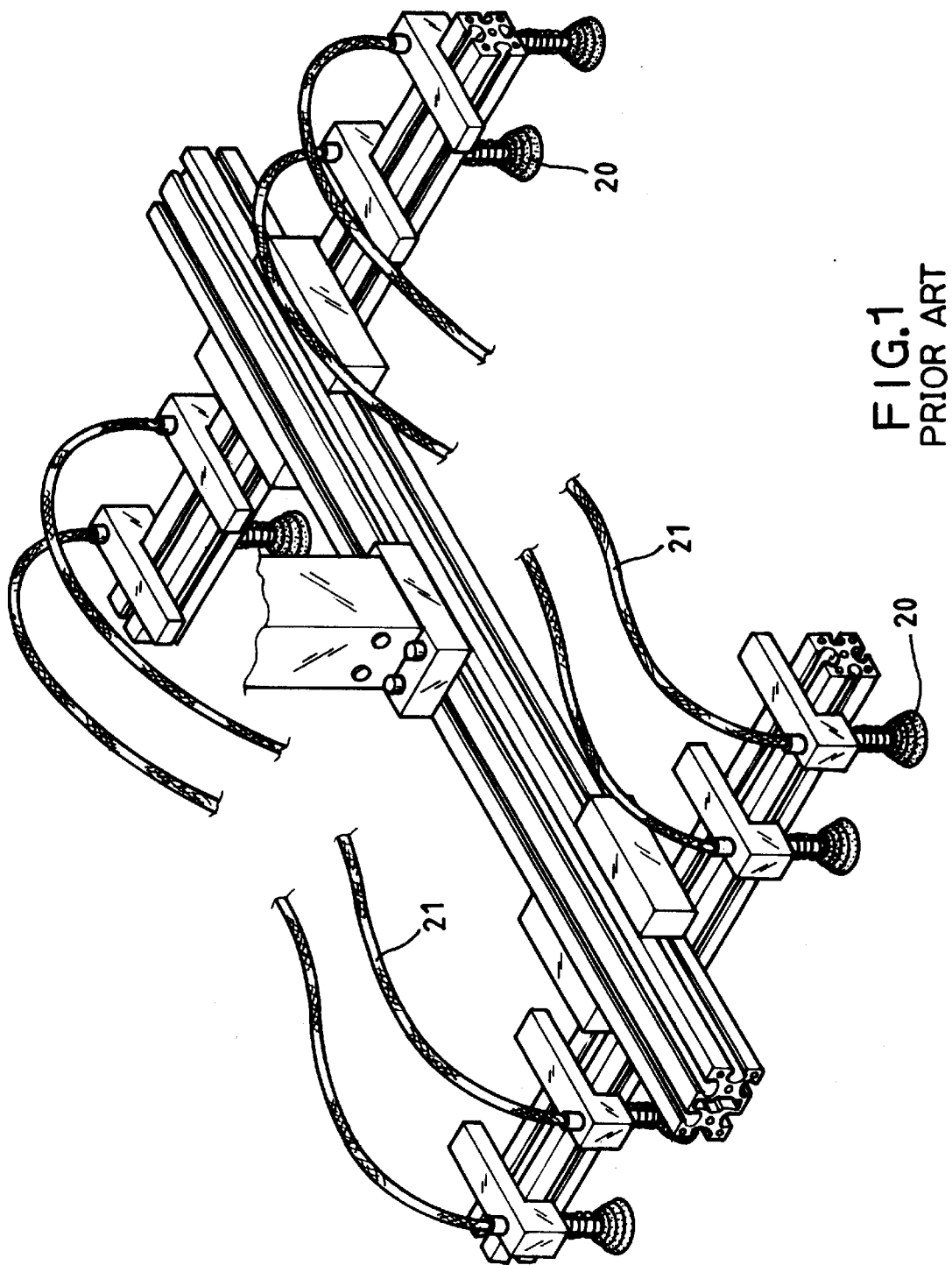
FIG. 1 is a perspective view of a conventional suction device in connection with hosepipes.
Figure 2:
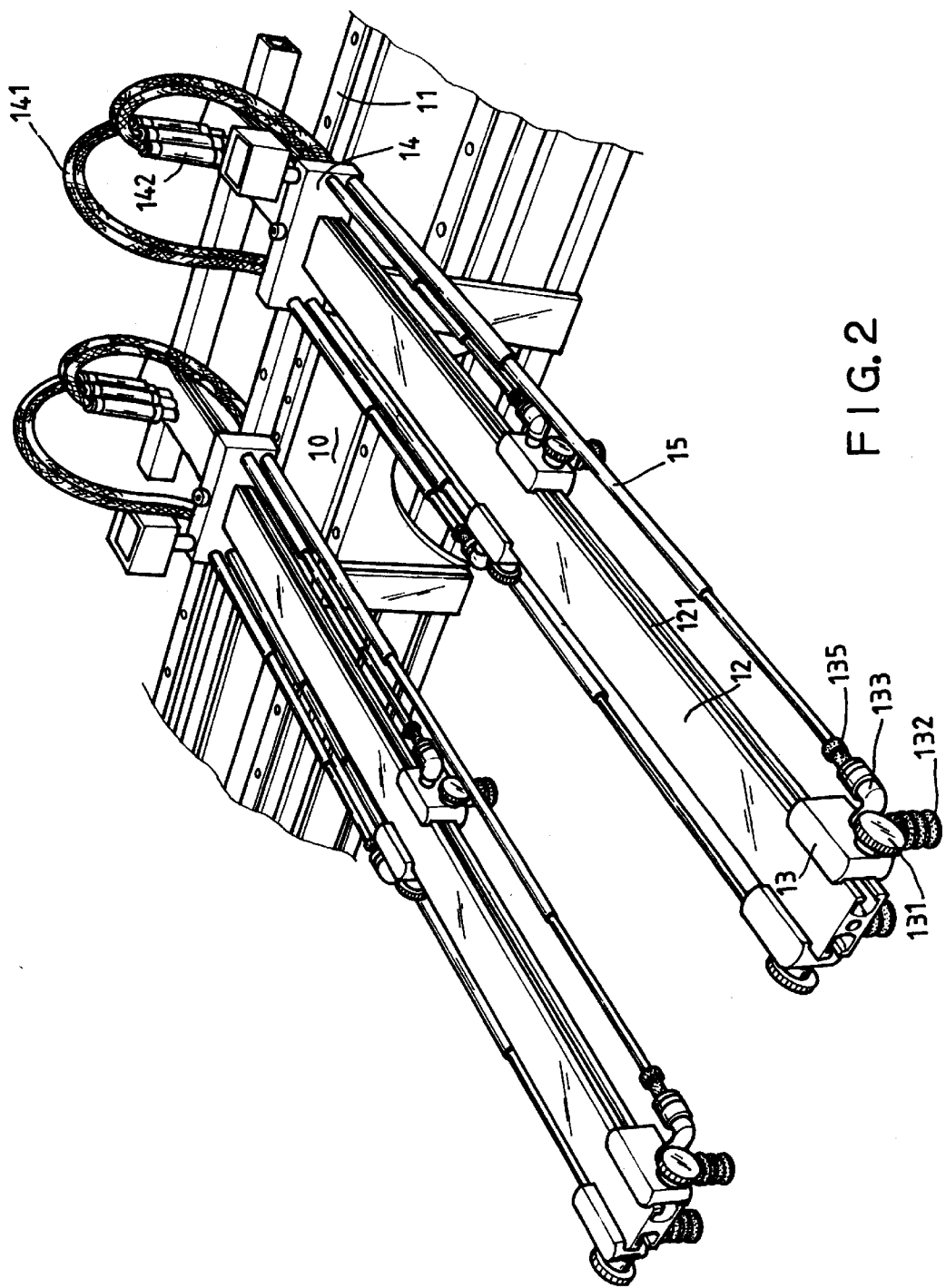
FIG. 2 is a perspective view of the present invention.
Figure 3:
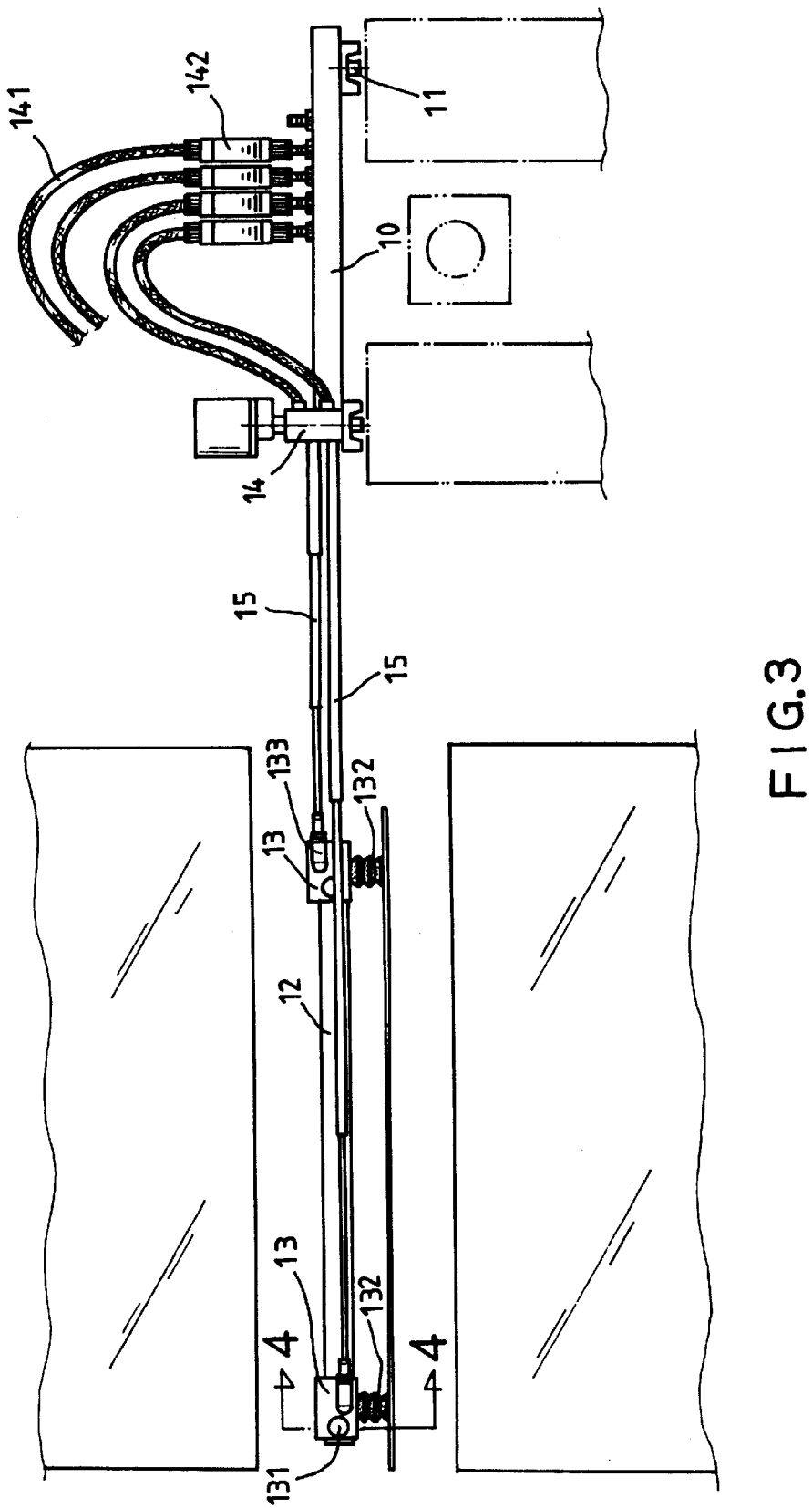
FIG. 3 is a side view of the present invention.

First of all, referring to FIGS. 2 and 3, the present invention utilizes a glide seat 10 to glide on a glide rail 11 of the suction device. The elements and power required by the gliding movement have been disclosed by prior art and don't belong to objects of the present invention so that no further descriptions are given hereinafter.

The present invention at least includes a cantilever 12, a plurality of glide pieces 13, a pipe-collecting piece 14 and a plurality of telescopic evacuating pipes 15. The cantilever 12 is provided with a glide groove 121 at both sides thereof. The glide pieces 13 are movable along the glide groove 121 of the cantilever 12 and are positioned by fastening knobs 131. Each of the glide pieces 13 has a vacuum sucker 132 at the bottom thereof. A first connector 133 is arranged at one side of the glide pieces 13 and used to connect through the internal piping with the vacuum sucker 132. The pipe-collecting piece 14 is installed at the inner end of the cantilever 12 and is used to join second connectors 142 in connection with a vacuum generator (not shown) through hosepipes 141. One end of the telescopic evacuating pipe 15 is fastened at the outer end of the pipe-collecting piece 14 while the other end is connected to the first connector 133.

Figure 4:
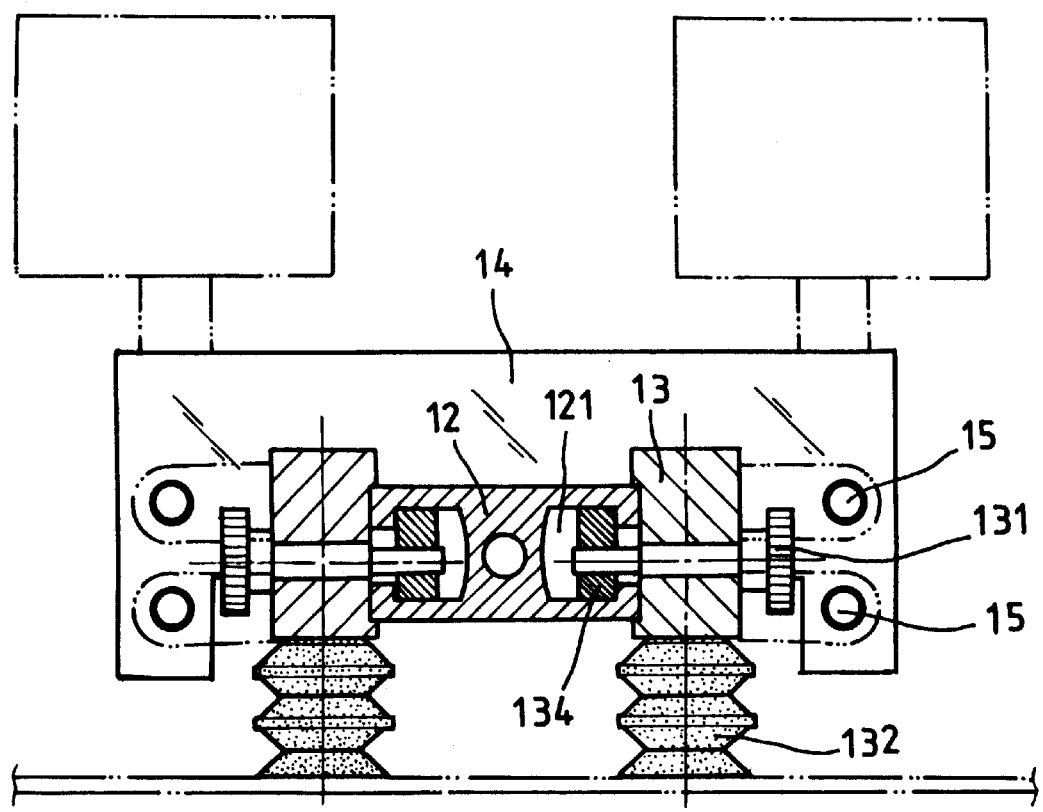
FIG. 4 is a cross-sectional view taken along the line of 4—4 in FIG. 3.
Figure 5:
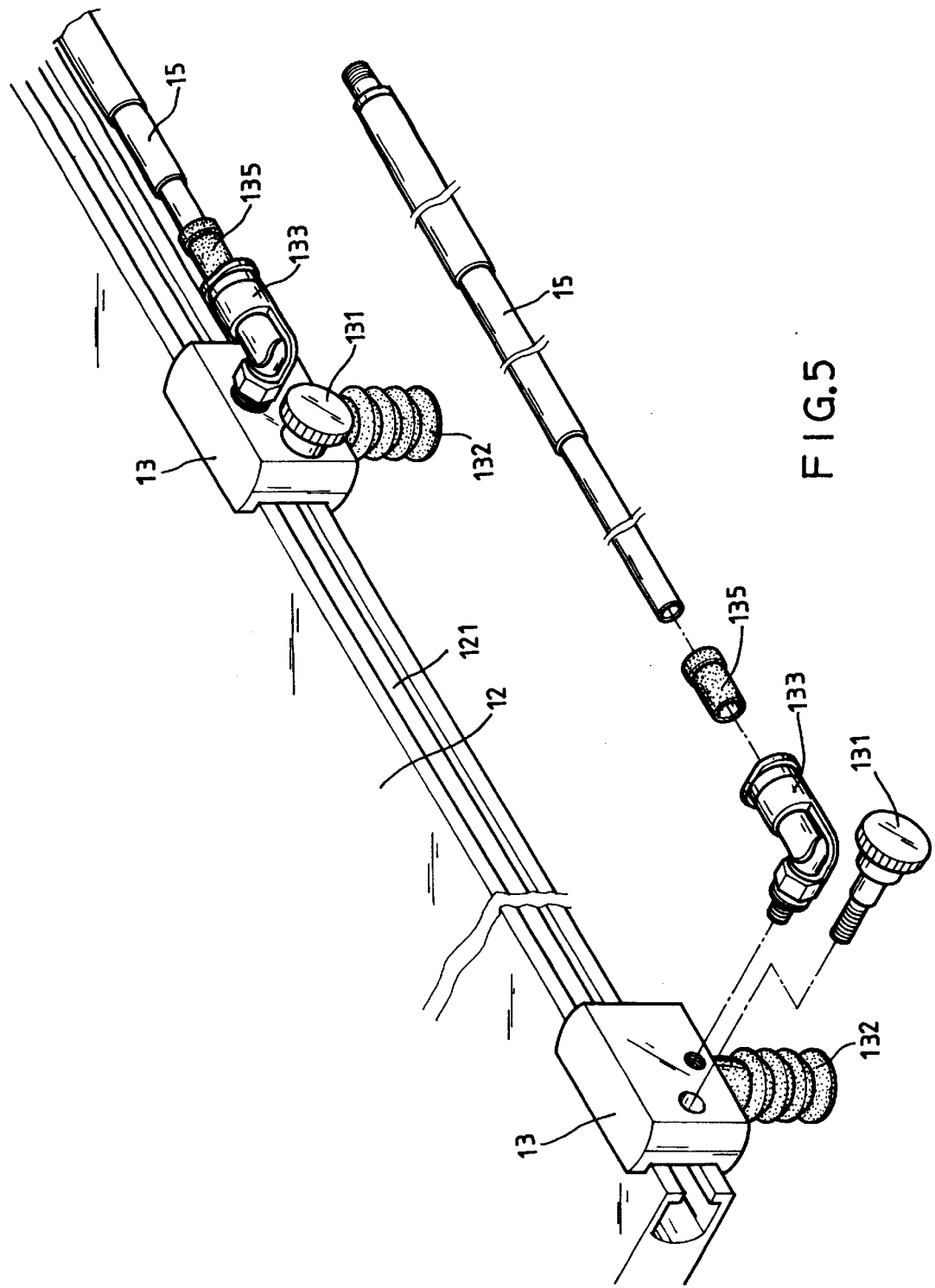
FIG. 5 is a perspective view of the assembly between glide pieces and telescopic evacuating pipes in accordance with the present invention.
Figure 6:
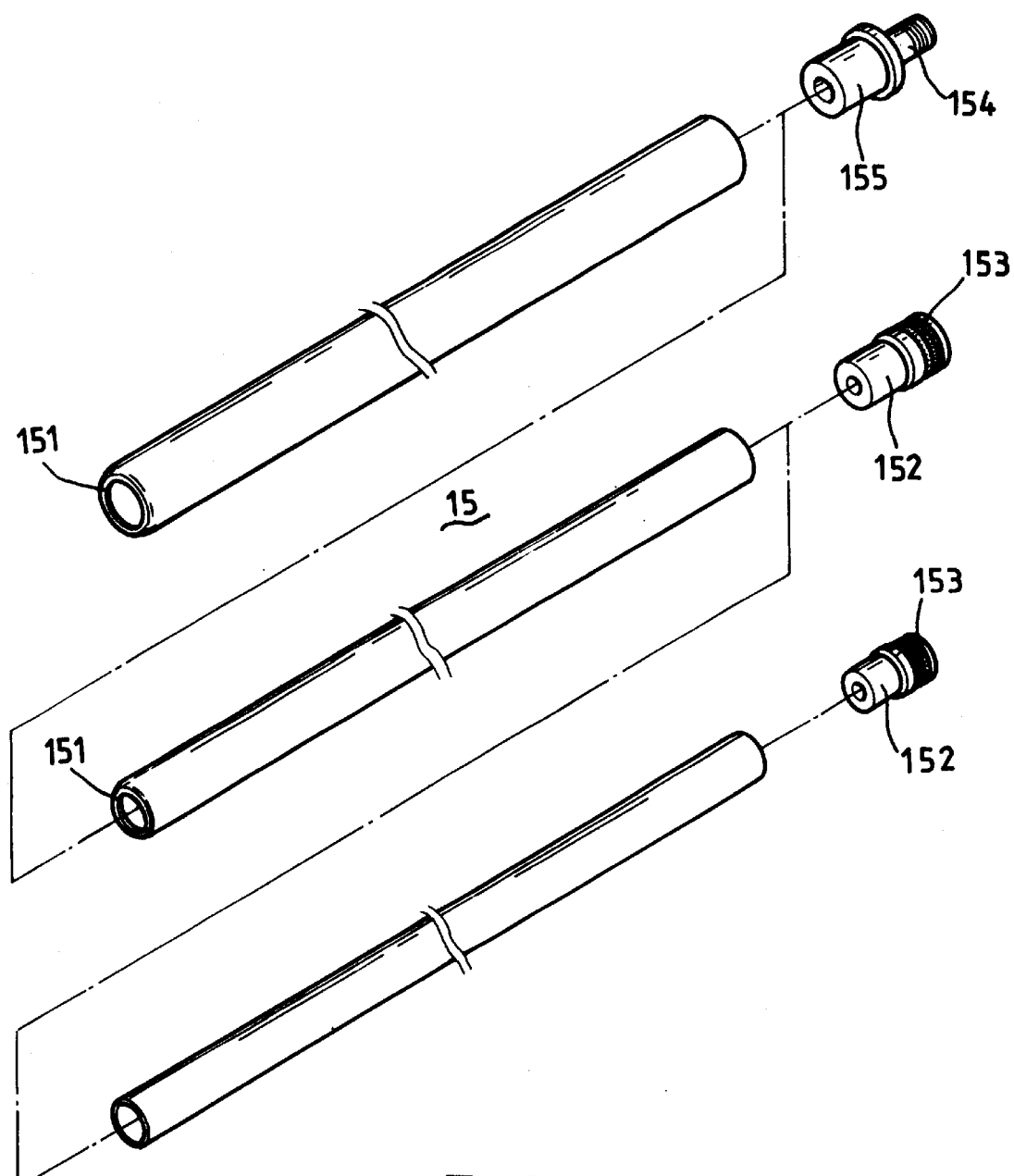
FIG. 6 is a perspective exploded view of the assembly between telescopic evacuating pipes in accordance with the present invention.
Figure 7:
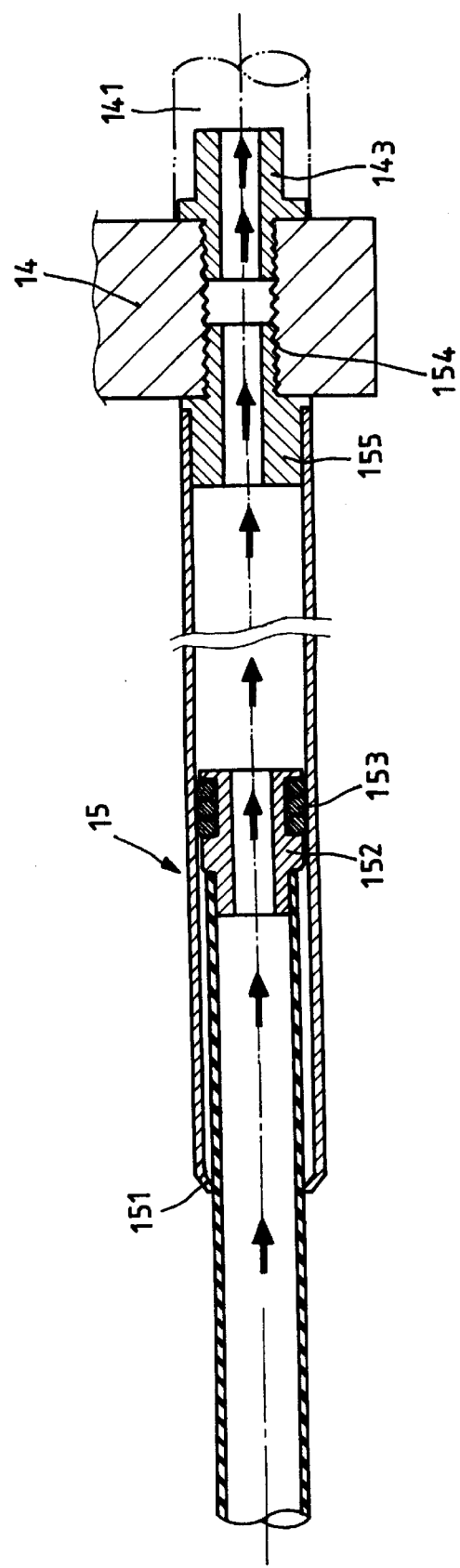
FIG. 7 is a longitudinal section of a telescopic evacuating pipe in accordance with the present invention.
Figure 8:
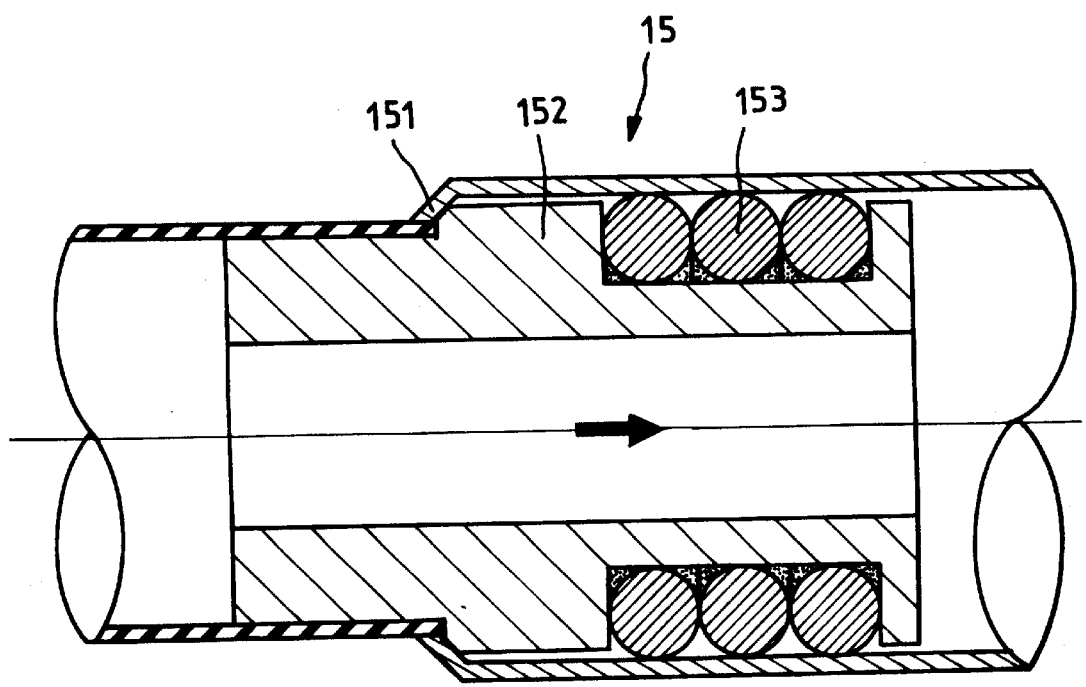
FIG. 8 is a longitudinal section of a connecting socket between telescopic evacuating pipes in accordance with the present invention.
Figure 9:
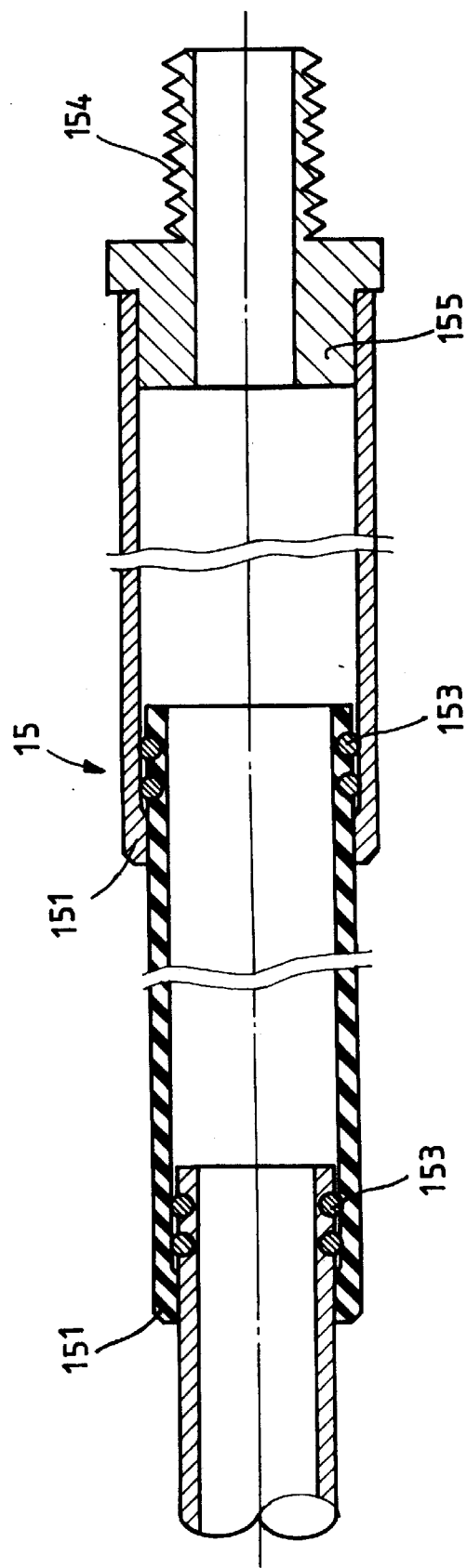
FIG. 9 is a longitudinal section of the present invention with an O-ring directly mounted to telescopic evacuating pipes.

Referring to FIG. 4, the glide pieces 13 includes a positioning piece 134 located within the glide groove 121 of the cantilever 12 and screwed by a fastening knob 131 penetrating through the glide piece 13. Referring to FIG. 5, the first connector 133 is secured to the outer side of the glide pieces 13 and communicates with the telescopic evacuating pipe 15 through a coupling sleeve 135. Referring to FIGS. 6 through 8, the telescopic evacuating pipe 15 consists of several pipes all of which except the foremost pipe are formed with a reduction head 151 at the front end thereof and all of which except the rearmost pipe are provided with a connecting socket 152. A leak-tight O-ring 153 is inserted on the rear end of the connecting socket 152. Furthermore, as shown in FIG. 9, the connecting socket 152 can be spared and the O-ring 153 is directly inserted on the outer rim of the rear end of all pipes except the rearmost pipe. Moreover, a first reducer 155 with male thread 154 is installed at the rear end of the rearmost pipe of the telescopic evacuating pipe 15 and is screwed to the pipe-collecting piece 14. The hose pipe 141 at the other end of the pipe-collecting piece 14 communicates with the corresponding telescopic evacuating pipe 15 through a screwed second reducer 155.

Based upon the above-mentioned, the conventional hose pipes can be replaced by the telescopic evacuating pipes 15 of the present invention. They are unidirectional and neatly arranged. Unlike the conventional hose pipes upwardly curved, they can be adjusted to the different positions of the vacuum suckers by means of their telescopic properties. As a result, the present invention is always kept in a flat state. Accordingly, the present invention can be operated in a narrow space, as shown in FIG. 3. Thus, the present invention can achieve the effects of neat arrangement and flat body.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A suction device with telescopic evacuating pipes comprising:

at least one cantilever having a glide groove at both sides thereof, respectively;

a plurality of glide pieces movable along said glide grooves of said cantilever and positioned by fastening knobs, each of said glide pieces having a vacuum sucker at the bottom thereof and a first connector at the outer side thereof which is used to connect with said vacuum sucker through internal piping;

a pipe-collecting piece installed at the inner end of said cantilever and used to join second connectors in connection with a vacuum generator through hose pipes; and a plurality of telescopic evacuating pipes having one end fastened at the outer end of said pipe-collecting piece and the other end connected to said first connector;

wherein said telescopic evacuating pipe consists of several pipes all of which except the foremost pipe are formed with a reduction head at the front end thereof and all of which except the rearmost pipe are provided with a leak-tight O-ring.

2. The suction device with telescopic evacuating pipes as recited in claim 1 whereon said O-ring is directly inserted on the outer rim of the rear end of all pipes of said telescopic evacuating pipes except the rearmost pipe.

3. The suction device with telescopic evacuating pipes as recited in claim 1 wherein all of pipes of said telescopic evacuating pipe except the rearmost pipe are provided with a connecting socket on the rear end of which a leak-tight O-ring is inserted.

4. The suction device with telescopic evacuating pipes as recited in claim 1 wherein said glide pieces includes a positioning piece located within said glide groove of said cantilever and screwed by a fastening knob penetrating through said glide piece.

5. The suction device with telescopic evacuating pipes as recited in claim 1 wherein said first connector is secured to the outer side of said glide pieces and communicates with said telescopic evacuating pipe through a coupling sleeve.

6. The suction device with telescopic evacuating pipes as recited in claim 1 wherein a first reducer with male thread is installed at the rear end of the rearmost pipe of the telescopic evacuating pipe and is screwed to the pipe-collecting piece, and wherein said hose pipe at the other end of the pipe-collecting piece communicates with the corresponding telescopic evacuating pipe through a screwed second reducer.

* * * * *